(12) United States Patent
Frey, Jr. et al.

(10) Patent No.: US 10,989,539 B1
(45) Date of Patent: Apr. 27, 2021

(54) ALIGNMENT OF ELECTRICAL DEVICES USING INERTIAL MEASUREMENT UNITS

(71) Applicant: BAE SYSTEMS INFORMATION AND ELECTRONIC SYSTEMS INTEGRATION INC., Nashua, NH (US)

(72) Inventors: Robert D. Frey, Jr., Bolton, MA (US); Austin J. Dionne, Chester, NH (US); Michael N. Mercier, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 278 days.

(21) Appl. No.: 15/962,228

(22) Filed: Apr. 25, 2018

(51) Int. Cl.
| | |
|---|---|
| *G01C 23/00* | (2006.01) |
| *G01C 21/18* | (2006.01) |
| *G01C 21/20* | (2006.01) |
| *B64D 45/00* | (2006.01) |

(52) U.S. Cl.
CPC ............. *G01C 21/18* (2013.01); *G01C 21/20* (2013.01); *G01C 23/00* (2013.01); *B64D 45/00* (2013.01)

(58) Field of Classification Search
CPC combination set(s) only.
See application file for complete search history.

(56) References Cited

U.S. PATENT DOCUMENTS

2019/0182415 A1* 6/2019 Sivan ..................... G06F 3/013

OTHER PUBLICATIONS

Alan M. Schneider, Kalman Filter Formulations for Transfer Alignment of Strapdown Inertial Units, Journal of the Institute of Navigation, vol. 30, No. 1, Spring 1983, pp. 72-89, US.

* cited by examiner

*Primary Examiner* — James M McPherson
(74) *Attorney, Agent, or Firm* — Sand, Sebolt & Wernow LPA; Scott J. Asmus

(57) ABSTRACT

An alignment system for sensor or other electrical device filters rate data from gyroscopes and integrates the same to determine an alignment error state that is populated into a direction cosine matrix that pre-rotates measurement from a first electrical device into an estimated coordinate frame to determine a static alignment between first and second electrical devices or sensors. The system may be part of a countermeasure system on an aircraft. A first electrical device may be an inertial navigation system (INS), and a second electrical device may be an inertial measurement unit (IMU). The attitude of the IMU is used to translate the detected threats from the countermeasure system into a common reference frame of the INS.

11 Claims, 4 Drawing Sheets

ALIGNMENT OF ELECTRICAL DEVICES USING INERTIAL MEASUREMENT UNITS

BACKGROUND

Technical Field

The present disclosure relates generally to aligning methods and an alignment system to align two electrical devices. More particularly, the present disclosure relates to aligning sensors on a platform with an inertial navigation system so as to enable detected threats to be populated or mapped into a common reference frame.

Background Information

Countermeasure systems on aircrafts are useful to identify incoming threats. The countermeasure system, which typically consists of electro-optical sensors, must precisely know the alignment of the electro-optical sensors carried by the aircraft in order to identify the incoming threat, which may be a missile or other munition. The electro-optical sensors on the countermeasure system are typically installed with requirements or parameters that enable mapping of the threat using the relative alignments of the sensors carried by the aircraft.

Due to the nature of the aircraft being a generally flexible body, the sensors tend to rotate relative to each other as external forces associated with flight are applied to the aircraft. Thus, it becomes difficult to align the sensors when they are exhibiting different attitudes relative to the other sensors or electrical devices carried by the aircraft.

SUMMARY

Issues continue to exist with countermeasure systems inasmuch as incoming threats to the aircraft continue to advance and become more sophisticated to avoid the countermeasure system. The present disclosure addresses these and other issues by providing an alignment system, which may be incorporated into a countermeasure system utilizing accelerometers or gyroscopes to account for flexure of the aircraft or its image frame while the aircraft is moving and precisely obtain the alignment of the electro-optical sensors in the countermeasure system carried by the aircraft. In accordance with another aspect of the present disclosure, the system provides a technical solution for measuring a set or a plurality of electro-optical sensors mounted on an aircraft and determine how each one of the sensors relates to each other or a common reference frame. The present disclosure may utilize gyroscopes in a sensor head that are mapped into a space identified by an inertial navigation system (INS) or an inertial measurement unit (IMU) carried by the aircraft.

According to one aspect, an exemplary embodiment of the present disclosure may provide an accurate and fast convergence of a transfer alignment method. The method can apply a filter, such as a low pass filter, to a gyroscope measurement to eliminate body flex of the platform while preserving sufficient low frequency common mode motion. This simplifies the Kalman filter by removing body flex states which improves a Kalman estimator by lowering computational load and results in improved alignment accuracy and reduced convergence time. Additionally, the method utilizes pre-rotation of an INS gyroscope measurement using improving knowledge from the converging solution to improve steady state accuracy of an attitude solution. In one particular embodiment, the present disclosure provides a technical solution to a transfer alignment process by taking advantage of a plurality of distributed sensors relative to a common reference frame.

According to another aspect of the present disclosure, a countermeasure system for an aircraft may include one or more gyroscopes mounted on an electro-optical sensor, which may be an infrared sensor, that is in electrical communication with a central gyroscope, which may be part of an INS, establishing a reference frame. A processor may be in communication with at least one computer readable storage medium having instructions encoded thereon, that when the instructions are executed by the processor, implement operations to compare or evaluate the rates output from each gyroscope relative to the central gyroscope on the INS. In one particular embodiment, there are three axillary gyroscopes mounted orthogonally to each other in the sensor head. By comparing the measurements of the rates of the body of the aircraft or air frame, the system determines the relative attitude between the electro-optical sensors. The system then maps the detections of the incoming threats that were observed in sensor space into the common reference frame that is maintained by a central processor. The gyroscopes and the central processor unit cooperate to map the detections of the incoming threats into a common reference frame at the central processor. In one particular implementation, an exemplary embodiment utilizes a process to determine the relative orientation with a Kalman estimator developed around the linearization of a rotation matrix.

In accordance with yet another aspect of the present disclosure, the system utilizes the gyroscopes coupled with the electro-optical sensors in the countermeasure system to transfer target locations observed by the sensor into the reference frame of the central processor unit. In one particular embodiment, the reference frame of the central processor unit is a northeast down reference frame. However, other reference frames having different orientations are entirely possible and may be utilized without departing from the scope of the present disclosure. The INS may be operating within and in conjunction with the reference frame from the CPU or central processor. Alternatively, the reference frame may be an aircraft reference frame because the countermeasure system is carried by the aircraft itself based on the orientation of the central processor IMU.

According to yet another aspect, an embodiment of the present disclosure may provide an alignment system comprising: a flexible frame; a first electrical device including a first gyroscope carried by the flexible frame; a second electrical device including a second gyroscope carried by flexible frame and spaced apart from the first gyroscope; a low-pass filter coupled to one of the first gyroscope and the second gyroscope to filter and remove frequencies above a filter threshold; an estimator coupled with the first gyroscope and the second gyroscope; and an integrator coupled with estimator and the low-pass filter to integrate an alignment error state result into a direction cosine matrix that pre-rotates measurements from the first gyroscope into a coordinate frame. This exemplary embodiment or another embodiment may further provide an initial misalignment magnitude that is eliminated by the alignment error state over a number of iterations performed by the integrator. This exemplary embodiment or another embodiment may further provide an aircraft, wherein the flexible frame is part of the aircraft; and a continuous operation of the estimator throughout flight of the aircraft. This exemplary embodiment or another embodiment may further provide wherein the estimator is an extended Kalman estimator due to linearization of the direction cosine matrix defining a transformation from the first electrical device to a second electrical device. This exemplary embodiment or another embodiment may further provide flight dynamics of the aircraft that determine a covariance trajectory. This exemplary embodiment or another embodiment may further provide an alignment indication status provided to a pilot of the aircraft generated from a measure of a predicted alignment accuracy from diagonals of the direction cosine matrix. This exemplary embodiment or another embodiment may further provide digital outputs from the second electrical device that are corrected for bias with an output of the extended Kalman estimator. This exemplary embodiment or another embodiment may further provide wherein the digital outputs are pqr rates and the second electrical device is an inertial measurement unit (IMU). This exemplary embodiment or another embodiment may further provide an attitude of the second electrical device generated from the digital outputs that have been corrected for bias. This exemplary embodiment or another embodiment may further provide a countermeasure system on the aircraft; wherein the first electrical device is an inertial navigation system (INS); wherein the second electrical device is an inertial measurement unit (IMU); a common reference frame; wherein the countermeasure system uses the INS and IMU to detect threats to the aircraft; and wherein the attitude of the IMU is used to translate the detected threats into the common reference frame. This exemplary embodiment or another embodiment may further provide bias-corrected rate data from the digital outputs of the second electrical device that is integrated by the integrator to generate the direction cosine matrix representing an attitude at every sensor in the counter measure system on the aircraft relative to the common reference frame.

In yet another aspect, an exemplary embodiment of the present disclosure may provide an alignment method comprising: filtering digital outputs from a first electrical device carried by a flexible frame to generate a first filtered output; filtering digital outputs from a second electrical device carried by the flexible frame and spaced apart from the first electrical device to generate a second filtered output; rotating the second electrical device relative to the first electrical device by flexing the flexible frame; estimating an alignment error state in an estimator based, at least in part, on the first and second filtered outputs; and integrating the alignment error state into a direction cosine matrix that pre-rotates measurement from the first electrical device into an estimated coordinate frame to determine a static alignment between the first and second sensors. This exemplary method or another method may further provide tracking variations in static alignment between the first and second sensors due to load on the flexible frame; and operating the estimator continuously during movement of the flexible frame carrying the first and second electrical devices. This exemplary embodiment or another embodiment may further provide wherein the flexible frame is part of an aircraft and the first and second electrical sensors are part of a countermeasure system on the aircraft; and flying the aircraft to generate forces that cause the flexible frame to flex and rotate the first electrical device to rotate relative to the second electrical device. This exemplary embodiment or another embodiment may further provide driving state covariance trajectory by flight dynamics of the aircraft. This exemplary embodiment or another embodiment may further provide measuring a predicted alignment accuracy from the diagonal of the covariance matrix used by the Kalman estimator. This exemplary embodiment or another embodiment may further provide correcting digital outputs from each electrical device for bias using output from the estimator. This exemplary embodiment or another embodiment may further provide generating an attitude for each electrical device. This exemplary embodiment or another embodiment may further provide translating threat detections observed in the countermeasure system into a common reference frame based on the attitude of at least one of the electrical devices.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
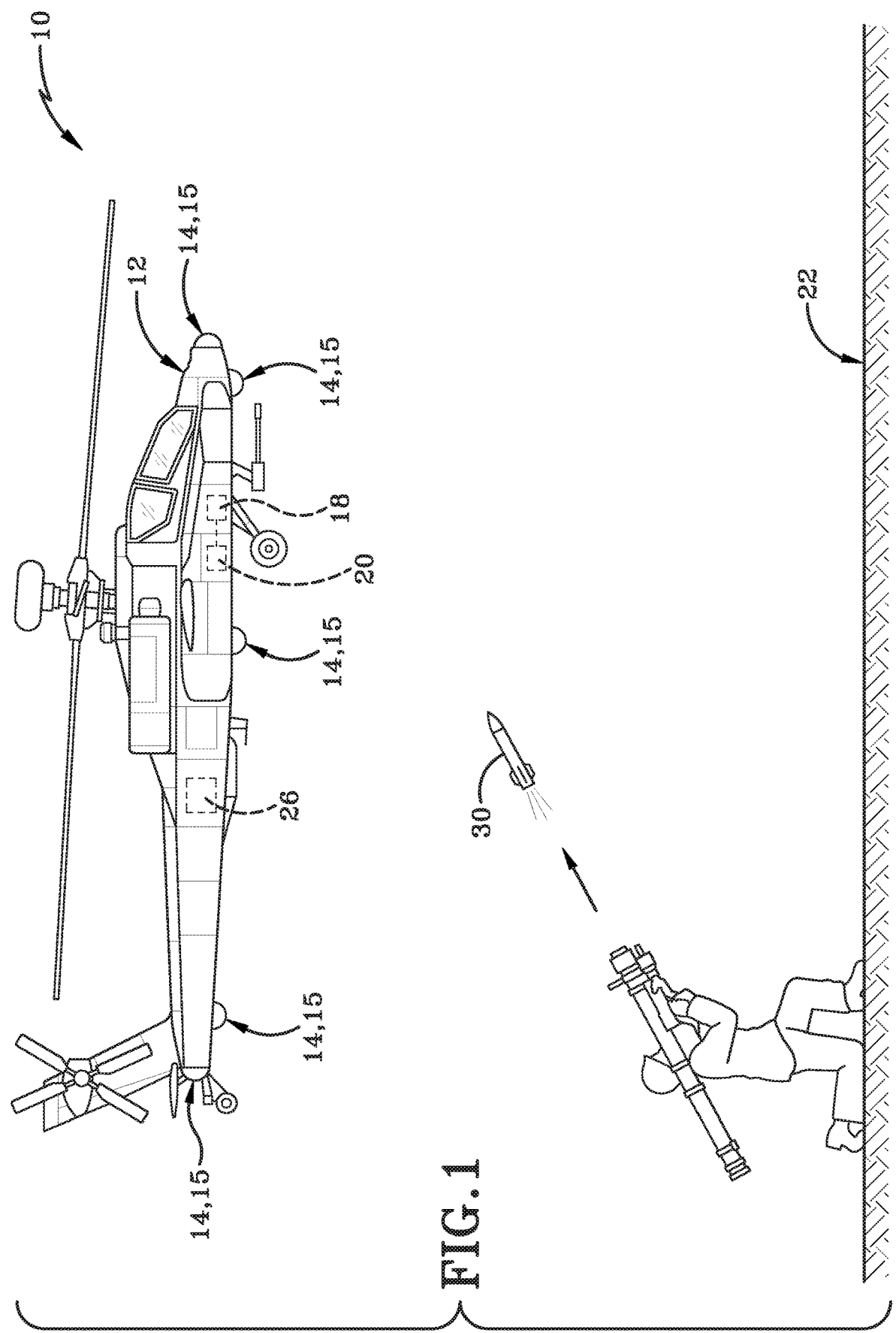
FIG. 1 (FIG. 1) is a schematic view of a platform having a flexible frame carrying multiple electrical devices that are aligned using inertial measurement units.

As depicted throughout the figures, the present disclosure provides a countermeasure system integrated with a plurality of sensors that cooperate to populate an identified threat incoming towards the aircraft into a common reference frame, which collectively define an alignment system. The alignment system in accordance with the present disclosure is shown generally throughout the figures at 10. The alignment system 10 may include a platform 12, at least one sensor 14 carried by the platform 12 that is configured to capture at least one first image or at least one first video of an incoming threat to the platform 12 and at least one non-transitory computer readable storage medium 18 carried by the platform 12.

The platform 12 may be any moveable platform that can move relative to the ground surface 22. In one particular embodiment, platform 12 may be an aerial vehicle. However, in other implementations or other embodiments, the platform 12 may be a ground based vehicle that moves, such as a car, truck, or tank. When the platform 12 is implemented as an aerial vehicle, the aerial platform 12 may be either manned or unmanned. In some implementations, the platform 12 may be a manned aerial platform that is piloted by a human operator. In one particular embodiment, the platform 12 is a helicopter or rotor craft.

The platform 12 includes an inertial navigation system (INS) 26 which is in operative communication with a countermeasure system on the helicopter. The INS 26 is a self-contained navigation system in which measurements provided by accelerometers and gyroscopes are used to track position and orientation of the platform 12 relative to a known starting point, orientation, or velocity. The INS 26 may include an inertial measurement unit (IMU), which may include three orthogonal rate-gyroscopes and three orthogonal accelerometers, measuring angular velocity and linear acceleration respectively. The INS 26 may further include a GPS component to identify the location of the platform 12 when it is moving and the IMU on the INS 26 is observing the angular velocity and linear acceleration. Additionally, the INS 26 can be used to determine and process signals from the gyroscopes and accelerometers to track the attitude of the platform 12. Generally, the platform 12 includes a frame as is well understood with aerial vehicle constructions. The frame of the platform may be either flexible or rigid.

Further, in a broad aspect, the INS 26 may be referred to generally as a first electrical device including a first gyroscope carried by the flexible frame. In a broad aspect, either the IMU or portions of the sensor 14 may be considered a second electrical device including a second gyroscope carried by flexible frame and spaced apart from the first gyroscope. As will be described in greater detail below, a low-pass filter may be coupled to one of the first gyroscope and the second gyroscope to filter and remove frequencies above a filter threshold, and an estimator may be coupled with the first gyroscope and the second gyroscope, and an integrator may be coupled with estimator and the low-pass filter to integrate an alignment error state result into a direction cosine matrix that pre-rotates measurements form the first gyroscope into a coordinate frame.

The storage medium 18 has instructions encoded thereon that, when executed by a processor 20, perform operations to provide an accurate and fast convergence of a transfer alignment method. The instructions or method applies a filter, such as a low pass filter, to a gyroscope measurement to eliminate body flex in an aircraft (i.e., the platform 12). This improves a Kalman estimator that predicts body motion to simplify the estimator by lowering computational load and results in improved alignment accuracy and reduced convergence time. Additionally, the instructions or method utilizes pre-rotation of an inertial navigation system (INS) gyroscope measurement using improving knowledge from the converging solution to improve steady state accuracy of an attitude solution. Threats identified by countermeasure sensors 14 having gyroscopes in a sensor head are mapped into a common reference frame by taking advantage of the improved transfer alignment.

The platform 12, which may also be referred to as helicopter 12, includes a legacy (i.e., preexisting) or a new infrared countermeasure (IRCM) system. The IRCM system is configured to identify and detect an incoming threat to the helicopter 12, such as a ground-to-air missile 30 fired from an enemy on the ground towards the helicopter 12, or a missile 30 fired at the helicopter 12 from another airborne vehicle. As part of the IRCM system on the helicopter 12, the sensor 14 may be one of a plurality of sensors carried by the helicopter 12 that provide full coverage for viewing and detecting incoming threats to the helicopter 12.

Each sensor 14 in the countermeasure system is integrated with a gyroscope that measures the attitude of the platform 12 at that respective sensor head. The gyroscopes may be three axis gyroscopes. In another aspect, the gyroscopes in each sensor may be MEMS gyroscopes. The gyroscopes on the sensors 14 may sometimes generally be referred to as an IMU 15.

According to one aspect, the system utilizes the instructions encoded on the storage medium 18 executed by the processor 20 to converge a Kalman estimator to an angled solution. The Kalman estimator utilizes a linear approximation, which is sometimes also referred to as a small angle approximation, to linearize around a point. This is effectuated because the sine of a small angle approximates the angle itself. The small angle approximation results in an error in the attitude estimation which will be proportional to the true alignment error. As the system solves for the aircraft attitude, it has better knowledge of its initial attitude. This initial attitude is then incorporated back into the Kalman estimator.

If the system starts with a large attitude uncertainty, the error will be larger than permitted for the countermeasure application, but will be smaller than the unknown values. The system continues to improve the accuracy of the error values until it is within a predetermined or preselected accuracy range. The system iterates and integrates error values and provides it back to the Kalman estimator to reduce the uncertainty value during the next iterative calculation. This solution extends and provides a more technical solution to a problem that remains from previous attempts (e.g., Schneider's Approach) which arrives at a single answer without any iterative processes and maintains the errors of its small angle approximations.

In one particular embodiment, the iterations continue so as to enable the error estimator to continually reduce its values. Since the flexure of the aircraft flexible frame changes over time, the angle associated with each one of the sensors 14 also changes in time in response to the flexion or flexure of the aircraft frame. Thus, the continual iterations of the system utilizing previous error estimations in its Kalman estimator provide an improved knowledge of alignment between the gyroscopes on the sensors 14 and the gyroscope in the INS 26. The system knows the accuracy of the angles based on the covariance of the Kalman estimator.

The system 10 measures the location of incoming threats to the aircraft. Each individual sensor 14 measures the direction to a threat (i.e., missile 30) relative to its own coordinate frame. This is typically defined along the bore sight of each respective sensor or field of view for each sensor 14. The system maps the measurement of each respective sensor identifying incoming threat into an x,y,z vector in a common reference frame. Each sensor 14 has a different mapping inasmuch as they are looking in different directions to provide full coverage of the aircraft to observe for incoming threats. The system helps improve the accuracy of incorporating the identified targets into the common reference frame by determining true direction of the bore sight or field of view of each sensor when the aircraft flexes. The system provides an accurate measurement of each sensor orientation relative to the common reference frame. Thus, the system improves the ability to accurately map the target vectors that each sensor measures back into the common reference frame.

Figure 2:
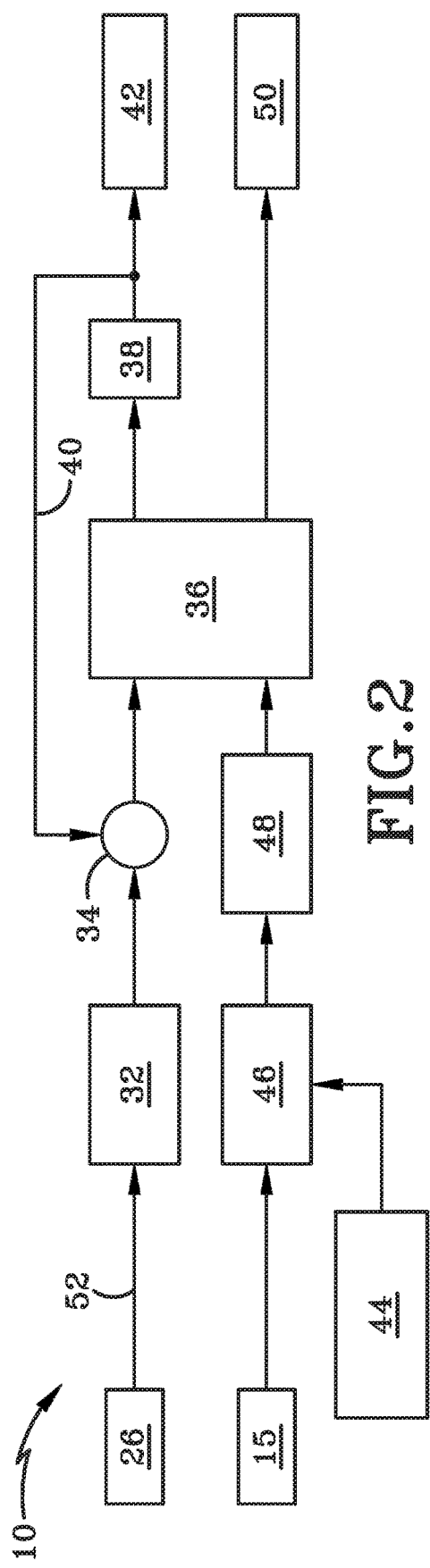
FIG. 2 (FIG. 2) is a flow chart depicting a system that determines static alignment and gyroscope bias.

FIG. 2 is a block diagram or flowchart of the alignment system 10. The diagram of the system includes the INS 26, a first low pass filter 32, a coordinate transformation 34, an estimator 36, an integrator 38 that outputs a static alignment 42. The static alignment is provided in a feedback loop 40 to the coordinate transformation 34 and as an output a static alignment 42. The diagram of the system further includes the IMU 15 on each sensor 14, an IMU to sensor transformation 44 that effectuates a rotation 46, a second low pass filter 48 that is coupled with the estimator 36. The estimator 36 also provides a gyroscope bias output 50.

In operation and with reference to FIG. 2, the flowchart is depicted that represents some aspects of the method or process of the present disclosure utilizing an alignment error state. More particularly, the system uses three states for alignment error and three states for gyroscope bias. The system eliminates effects of platform or aircraft flexure during static alignment by low pass filtering of the rate measurements determined by the gyroscopes of IMU 15.

In one particular embodiment, the each low pass filter 32, 48 utilizes a 0.5 hertz bandwidth to eliminate the flexible rates of the flexible frame of the platform 12 while allowing sufficient aircraft motion to observe the transfer alignment. However, other bandwidths may be utilized, dependent on the nature of the airframe, without departing from the intended scope of the present disclosure. System 10 uses an alignment error state to eliminate a performance dependency on initial misalignment magnitude. The error state result is integrated via integrator 38 into a direction cosine matrix at the coordinate transformation 34, which pre-rotates the INS measurements into the estimated IMU coordinate frame or common reference frame.

The estimator 36 operates continuously throughout the flight of the aircraft or platform 12. The continuous operation of the estimator tracks any potential variation in static alignment due to aircraft mode variation or environmental changes. In one particular embodiment, the process or method of the present disclosure utilizes an extended Kalman estimator 36 due to the linearization of the direction cosine matrix defining the static transformation of the INS 26 to the sensor IMU frame. The system 10 selects the process and measurement noise covariation parameters to optimize conversion performance. Flight dynamics during a particular flight of the aircraft drive the state covariance trajectory. The diagonals of the covariance matrix provide a measure of the predicted alignment accuracy. System 10 uses the measure of the predicted alignment accuracy to generate the required indication of alignment status for the pilot.

To counter the impact of flex motion on the measurement of a target location relative to the aircraft, the system 10 corrects the IMU outputs from each sensor for bias using the output of the Kalman estimator 36. The system 10 then generates a low-latency, high bandwidth sensor attitude. The system translates target detections from that sensor into the earth reference frame or the common reference frame.

With continued reference to FIG. 2, the INS 26 is a central processor that generates the common reference frame. In one particular embodiment, the INS 26 includes GPS, accelerometers, and gyroscopes that cooperate to determine the aircraft's attitude and location in its inertial space reference frame. System 10 extracts PQR rates, along line 52, from the INS 26 from the gyroscope portion of the INS 26. The P-rate is the rotation about an X-axis, the Q-rate is the rotation about a Y-axis, and the R-rate is the rotation about a Z-axis. These rotational rates are within the INS reference frame, which may be, in one particular embodiment, the same as the common reference frame. The PQR rates are then filtered with the first filter 32. In one particular embodiment, the filter 32 is a low pass filter. However, it is envisioned that other types of filters may be applied and may be able to achieve similar results or similar functions without departing from the scope of the present disclosure.

One issue that continues to exist and complicates transfer alignment processes is the distance between the INS 26 and the IMU 15 on the aircraft platform 12. Since the frame of the platform 12 is a flexible body, the distance between the INS 26 and the IMU 15 causes each sensor 14 to experience different accelerations based on the aircraft body flexure and flexion. Both the INS 26 and the IMU 15 measure the angular rates that the airframe body is experiencing at each respective electrical device (e.g. IMU 15 or INS 26).

The system 10 identifies the effects of flexure as a function of frequency. Since the modes of an aircraft body are typically 10 hertz and above, the low pass filters 32, 48 filter out these frequency modes that are higher than what the filter permits. Stated otherwise, the system filters out the flexible components of the aircraft body and only permits passage of low frequency motions that are fairly uncorrupted and common to both the INS and the IMU. Thus, the low pass filter 32 is associated with the INS data (the PQR rates) and the low pass filter 48 is associated with the IMU data (the PQR rates). The two low pass filters are matched to the same frequency to eliminate the flexible component measurements of the aircraft body. The low pass filters 32, 48 remove the flexible motion, which is relative differential motion, between the INS and the IMU.

With continued reference to FIG. 2, the coordinate transformation 34 is positioned after the low pass filter 32 and before the Kalman estimator 36. The coordinate transformation 34 receives corrective or feedback 40 information that is integrated in integrator 38 subsequent to the Kalman estimator 36 that produces the alignment error state. When the estimator 38 is converged, the resulting PQR data will closely match the PQR data from the IMU 15 on the lower path representing the gyroscope bias 50. The feedback 40 path aligned with the coordinate transformation 34 enables system 10 to improve knowledge and accuracy of the actual relative orientation. The system 10 feeds back the information to the coordinate transformation 34 to reduce uncertainty which allows system 10 to converge towards the actual alignment. The static misalignment is a relative relationship based on the high frequency motions being filtered out. Thus, the term "static" refers to approximately average movements of low frequency between the INS 26 and the IMU 15. On average, the INS and IMU may have a relatively fixed or "static" misalignment.

As depicted in FIG. 2, the direction cosine matrix is represented by the coordinate transformation 34. The direction cosine matrix represents the rotation from one frame of reference to another. In this case, the coordinate transform 34 is transformation from the INS frame to the sensor frame.

With continued reference to FIG. 2, the system pre-rotates the IMU 15 prior to the application of measured data to the estimator 36. The rotation 46 is a fixed measurement based on a factory calibration to align the sensor IMU with the sensor frame.

In one particular embodiment, the Kalman estimator 36 is a six-state estimator. The six states of the six-state estimator are roll attitude, pitch attitude, yaw attitude, P-gyro bias, Q-gyro bias, and R-gyro bias. The gyroscopes in each IMU 15 may be relatively accuracy MEMS gyroscopes that have relatively poor bias compared to the gyroscopes located in the INS 26. The MEMS gyroscopes are compromised due to their low power consumption and other low SWaP requirements. The results of this are the gyroscope bias 50. The gyroscope bias 50 is output as a bias state from the six-state Kalman estimator 36 which is used by the system 10 to assist in the calculation with high bandwidth attitude measurements that compensate for dynamic flexure when mapping target detections to inertial space, as indicated by FIG. 3.

Figure 3:
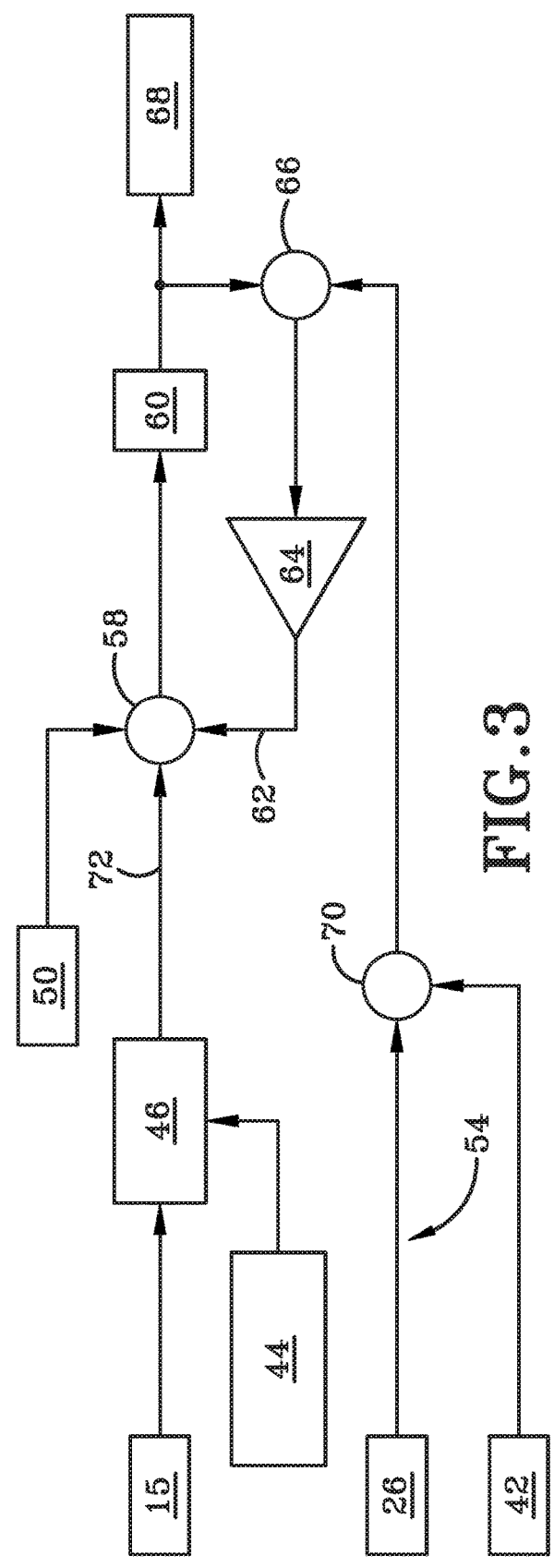
FIG. 3 (FIG. 3) is a flow chart depicting the system determining high bandwidth sensor attitude to compensate for dynamic flexure when mapping target detections to inertial space.

In operation and with reference to FIG. 3, the flowchart is depicted that represents some aspects of the method or process of the present disclosure utilizing the system that uses high bandwidth attitude measurements to compensate for the dynamic flexure when mapping target detections into inertial space. The flowchart of FIG. 3 includes an IMU to sensor transformation 44 operatively connected to box representing rotation 46, and adder 58. Subsequent to adder 58 is an integrator 60 receiving information from a feedback line 62 that is amplified by amplifier 64 prior to connection to adder 58. The integrator 60 is connected with a differencer 66 and an output of high bandwidth sensor attitude 68. The INS 26 and the static alignment 42 are connected with an output of a coordinate transform 70 that provides low bandwidth sensor attitude with adder 66.

In one particular embodiment, the input to difference 66 from coordinate transform 70 is a low bandwidth, very highly accurate Northeast Down (NED) referenced attitude solution for the local sensor attitude is and the input to difference 66 from the integrator 60 is a high bandwidth, low accuracy over long periods of time knowledge of what the aircraft attitude is. Thus, system 10 combines these two streams of data to generate a composite attitude solution including the low bandwidth sensor attitude solution and portions of the high bandwidth sensor attitude solution.

Each sensor IMU 15 is subject to drift due to residual gyroscope bias and angle random walk resulting from integration of random noise and gravity sensitivity or G-sensitivity. Each sensor IMU 15 has also been selected to provide a high sample rate in order to support stabilization at sensor frame rates. The attitude solution from IMU 15 alone can be characterized as high bandwidth and high drift measurement of sensor attitude. System 10 transforms high quality INS 26 attitude with the sensor attitude using the static alignment derived from the transfer alignment process identified above. The result is a low bandwidth, zero-drift measurement of the sensor attitude. When combined, the high and low bandwidth attitude measurements yield a zero-drift high bandwidth measurement.

Since a portion of the transfer alignment process, as identified in FIG. 2, identifies the relative "static" alignment due to the low frequency relative comparisons between the INS and IMU, the flowchart of FIG. 3 uses high bandwidth attitude measurements to compensate for the dynamic flexure when mapping target detections into inertial space. In order to operate at the frame rates of the sensor 14, which are typically on the order of kilohertz, the system has a high bandwidth measurement of the actual motion so the system 10 can locate the target 30 location in space. The IMU 15 stabilizes a line of sight based on a measurement of how the line of sight is being rotated. The IMU 15 outputs a rotational rate along line 72. The IMU to sensor transformation 44 identifies how the IMU 15 is aligned relative to the sensor 14. The PQR rates are rotated at rotation 46 to the reference frame. The gyroscope bias 50 state rates are subtracted via adder 58 from the PQR rates from the IMU 15 subsequent to the rotation.

Subsequent to the adder 58, the integrator 60 integrates the PQR rates to derive an attitude relative to an inertial frame. As the IMU 15 is rotated, the integrator 60 accounts for the rotation of the inertial frame and how PQR rate measurements are added into the frame rotation and how the frame varies with angle. In one particular embodiment, the integrator 60 integrates the PQR rates to a roll attitude, pitch attitude, and yaw attitude of the sensor relative to inertial space exiting the integrator 60. The high bandwidth sensor attitude 68 exiting the integrator 60 is the attitude of the sensor relative to the NED reference frame.

The INS 26 provides aircraft attitude data 54 relating aircraft attitude in the NED frame. The static alignment 42 entering into the multiplier or combiner 70 is combined with the aircraft measured platform attitude at the INS 26 to generate the low bandwidth, zero drift measurement of the sensor attitude relative to the NED frame.

The output of the integrator 60 is subtracted from the output of the multiplier 70. The difference is scaled by the amplifier 64 such that a small portion of the difference between the two attitude solutions is applied as a correction to the high bandwidth attitude. In one particular embodiment, an exemplary reason for doing this is based on, even if the system has perfect knowledge of the initial attitude, the MEMS sensors on the IMU typically have bad bias and bad drift and significant noise, the attitude solution tends to drift away and the system 10 draws the solution back in by using a low frequency that is below the drift rate of the IMU. At a low drift rate below the frequency of the IMU, system 10 compares local high bandwidth with solution to what an attitude solution should be based on the aircraft's measurement and adjusts the local knowledge accordingly. The gain of the amplifier determines frequency at which these two solutions are combined. This frequency determines the low pass bandwidth to be applied to the INS attitude solution and the high pass bandwidth applied to the IMU attitude solution. Typically, these are frequencies lower than 1 Hz, the selection of the combining frequency dependent on IMU and INS characteristics.

Figure 4:
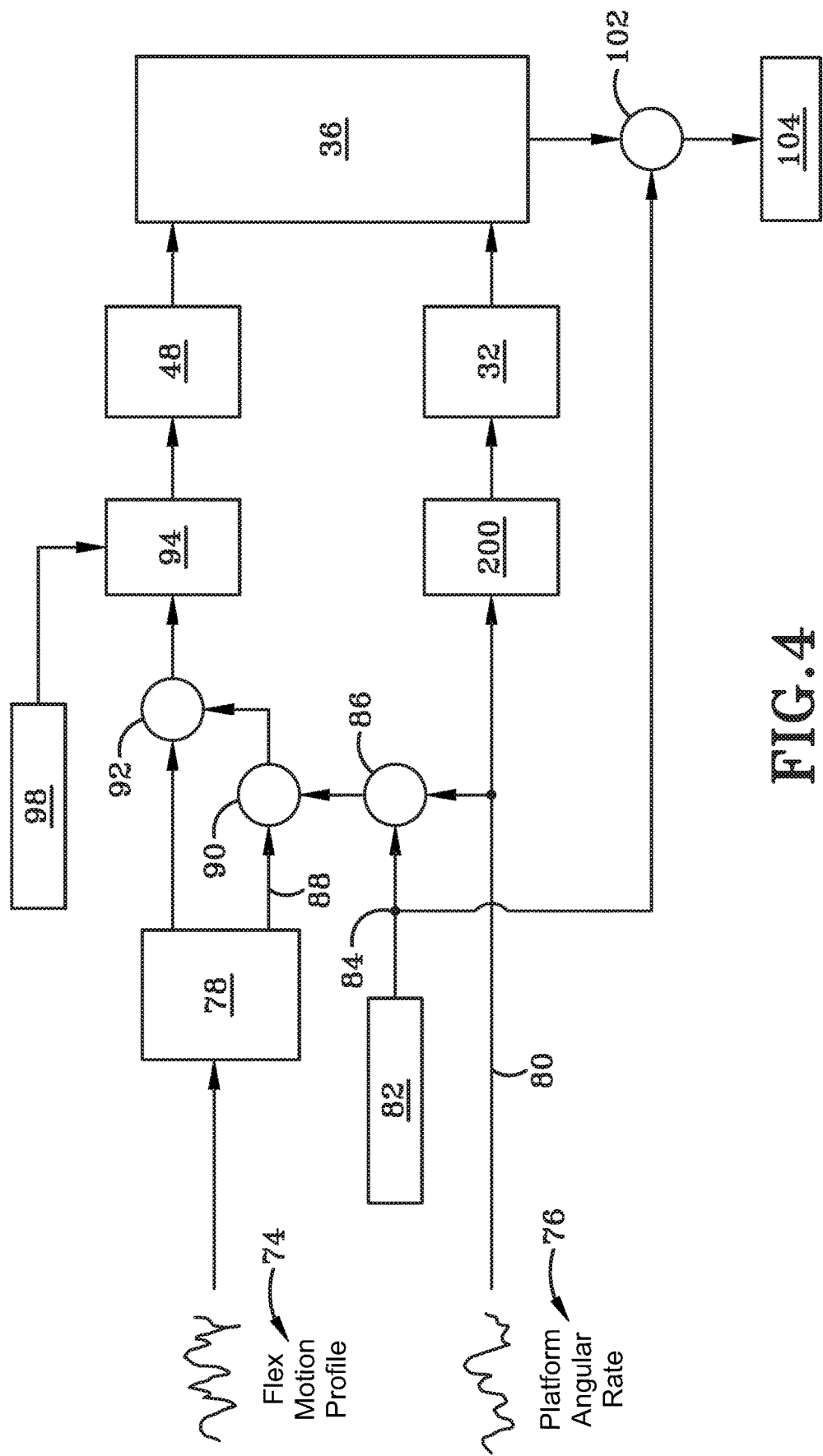
FIG. 4 (FIG. 4) is a flow chart depicting a validation model of the alignment model of FIG. 2 and FIG. 3.

In operation and with reference to FIG. 4, the flowchart identifies and represents a simulation model performing a random draw of component values. The simulation can be run for an extended period of time to converge a solution that is plotted for a standard deviation over time to validate the design of the system 10. The flex motion profile 74 and the platform angular rate 76 profile generate drive the variabilities in the system 10. The model of FIG. 4 is used to validate the solution approach identified above with reference to FIG. 2 and FIG. 3. The model of FIG. 4 bounds the error terms that are available and randomly combining them and running them repeatedly over an extended period of time using a Monte Carlo approach to do a statistical estimate of what the performance will be over many systems.

The platform angular rate 76 traveling along line 80 should be common for both the IMU 15 and the INS 26. What the IMU 15 actually observes as a rate is corrupted by the static misalignment 82. In the Monte Carlo analysis, the model of FIG. 4 selects a static misalignment error to incorporate it with the static alignment DCM 82 at node 84 and sends the combined data to a converter 86. Converter 86 converts the aircraft rate into a sensor frame rate. Since the IMU 15 is moving relative to the INS 26, an additional transformation 88 that is dynamic and happening over time occurs as output from the transformation 78. The dynamic transformation 88 is applied to the sensor reference frame common mode motion output by converter 86 and combined with the time varying alignment transformation along line 88 at a combiner 90. This data is added at an adder 92 with the actual relative rate between the IMU 15 and the INS 26. The information leaving the adder 92 is a combination of the platform rate re-oriented to the sensor based on the misalignment that the system is trying to measure and that is further corrupted by the angular rate of the flex motion profile 74. The IMU 15 and INS 26 gyroscope responses are modeled in 94 and 200. Model 94 and 200 model the quantization, bias, axes misorthogonality and other error terms. Model 94 includes linear acceleration 98 as these sensors are likely lower grade devices with sensitivity to acceleration environments present on the aircraft. Model 94 output is low pass filtered by 48. Model 200 output is low pass filtered by 32. The two filtered rate measurements are processed by the transfer alignment algorithm 36. The output from the transfer alignment 36 is the static alignment which is compared in a comparer 102 with the known static alignment to determine performance of the alignment error 104. The alignment error 104 is a numerical value associated with how well the model performed in determining the accuracy of the alignment. Using many runs of the model with random drawn error parameters, the statistical performance of the system can be determined. The statistical performance of the system has been shown to have an excellent accuracy within 0.15 degrees in about fourteen seconds or less.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Figure 5:
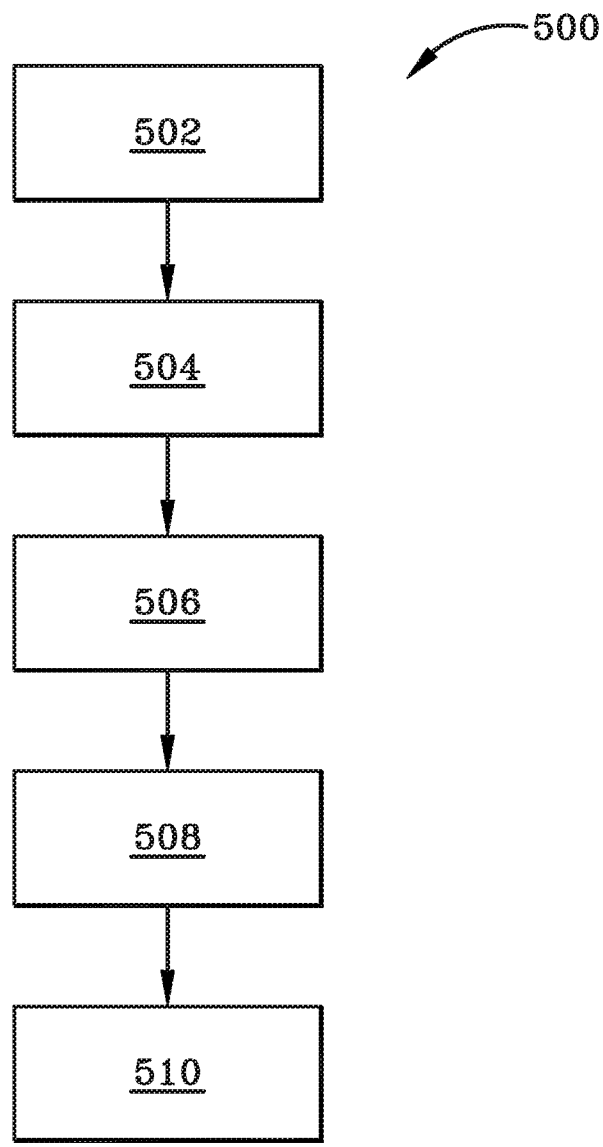
FIG. 5 (FIG. 5) is a flow chart depicting an exemplar method of the present disclosure.

For example, FIG. 5 depicts one exemplary method for an alignment system generally at 500. The method 500 may include filtering digital outputs from a first electrical device carried by a flexible frame to generate a first filtered output, which is shown generally at 502. The method 500 may include filtering digital outputs from a second electrical device carried by the flexible frame and spaced apart from the first electrical device to generate a second filtered output, which is shown generally at 504. The method 500 may include rotating the second electrical device relative to the first electrical device by flexing the flexible frame, which is shown generally at 506. The method 500 may include estimating an alignment error state in an estimator based, at least in part, on the first and second filtered outputs, which is shown generally at 508. The method 500 may include integrating the alignment error state into a direction cosine matrix that pre-rotates measurement from the first electrical device into an estimated coordinate frame to determine a static alignment between the first and second sensors, which is shown generally at 510.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, in some particular embodiments, reference is made to the frame as being a flexible frame, however the concepts provided herein apply similarly to rigid frame platforms. For example, they system provided herein can apply to a rigid frame platform where the system was installed/mounted but there is unknown misalignment between the sensors during in the installation.

By way of additional example, some of the embodiments provided herein relate to the alignment system 10 integrated into a countermeasure system. However, the alignment system 10 could additionally be applied to a laser communication system that needs to transmit electro-optical or other radiated signals between various sensors, or transceivers. The alignment system is able to find the misalignment between these sensors, as well as any other type of sensor carried by the platform 12, without departing from the scope and intent of the present disclosure. As such, an embodiment of the present disclosure may provide an alignment system comprising: a frame, which may be either rigid or flexible; a first electrical device, which may be an INS or other device including a first gyroscope carried by the frame; a second electrical device, which may be a transceiver in a laser communication system including a second gyroscope carried by the frame and spaced apart from the first gyroscope. This exemplary embodiment may provide that the laser communication needs to determine the location of a remote transceiver to effectuate the communication between the platform and the remote transceiver in a manner that populates the location of the remote transceiver into a common reference frame, such as one provided in the INS. This embodiment may further include a low-pass filter coupled to one of the first gyroscope and the second gyroscope to filter and remove frequencies above a filter threshold; and an estimator coupled with the first gyroscope and the second gyroscope; and an integrator coupled with estimator and the low-pass filter to integrate an alignment error state result into a direction cosine matrix that pre-rotates measurements from the first gyroscope into a coordinate frame to effectuate the laser communication between multiple transceivers either on the platform or remote from the platform.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, such as processor 20, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An alignment system comprising:
   a frame;
   a first electrical device including a first gyroscope carried by the frame;
   a second electrical device including a second gyroscope carried by the frame and spaced apart from the first gyroscope;
   a low-pass filter coupled to one of the first gyroscope and the second gyroscope to filter and remove frequencies above a filter threshold;
   an estimator coupled with the first gyroscope and the second gyroscope; and
   an integrator coupled with estimator and the low-pass filter to integrate an alignment error state result into a direction cosine matrix that pre-rotates measurements from the first gyroscope into a coordinate frame.

2. The alignment system of claim 1, further comprising:
   an initial misalignment magnitude that is eliminated by an alignment error state over a number of iterations performed by the integrator.

3. The alignment system of claim 2, further comprising:
   an aircraft, wherein the frame is part of the aircraft; and
   a continuous operation of the estimator throughout flight of the aircraft.

4. The alignment system of claim 3, further comprising:
   wherein the estimator is an extended Kalman estimator to linearize the direction cosine matrix defining a transformation from the first electrical device to a second electrical device.

5. The alignment system of claim 4, further comprising:
   flight dynamics of the aircraft that determine a covariance trajectory.

6. The alignment system of claim 5, further comprising:
   an alignment indication status provided to a pilot of the aircraft generated from a measure of a predicted alignment accuracy from a diagonal of a covariance matrix.

7. The alignment system of claim 6, further comprising:
   digital outputs from the second electrical device that are corrected for bias with an output of the extended Kalman estimator.

8. The alignment system of claim 7, wherein the digital outputs are pqr rates and the second electrical device is an inertial measurement unit (IMU).

9. The alignment system of claim 6, further comprising:
   an attitude of the second electrical device generated from the digital outputs that have been corrected for bias.

10. The alignment system of claim 9, further comprising:
    a countermeasure system on the aircraft;
    wherein the first electrical device is an inertial navigation system (INS);
    wherein the second electrical device is an inertial measurement unit (IMU);
    a common reference frame;
    wherein the countermeasure system uses the INS and IMU to detect threats to the aircraft; and
    wherein an attitude of the IMU is used to translate the detected threats into the common reference frame.

11. The alignment system of claim 10, further comprising:
    bias-corrected rate data from the digital outputs of the second electrical device that is integrated by the integrator to generate the direction cosine matrix representing an attitude at every sensor in the countermeasure system on the aircraft relative to the common reference frame.

* * * * *